United States Patent [19]

Swales et al.

[11] 4,296,076

[45] Oct. 20, 1981

[54] CHROMIC OXIDE PRODUCTION

[75] Inventors: Danvers A. Swales; Michael A. Marshall, both of Darlington, England

[73] Assignee: British Chrome & Chemicals Ltd., Stockton-on Tees, England

[21] Appl. No.: 166,713

[22] Filed: Jul. 7, 1980

Related U.S. Application Data

[63] Continuation-in-part of Ser. No. 3,333, Jan. 15, 1979, abandoned.

[51] Int. Cl.³ ............................................ C01G 37/033
[52] U.S. Cl. ........................................ 423/53; 423/607
[58] Field of Search ................................... 423/53, 607

[56] References Cited

U.S. PATENT DOCUMENTS

| | | |
|---|---|---|
| 2,209,907 | 7/1940 | Tarr . |
| 4,040,860 | 8/1977 | Mansmann et al. ................ 423/607 |
| 4,052,225 | 10/1977 | Mansmann et al. ................ 423/607 |
| 4,127,643 | 11/1978 | Carlin ................................. 423/607 |

FOREIGN PATENT DOCUMENTS

| | | | |
|---|---|---|---|
| 2635086 | 2/1978 | Fed. Rep. of Germany ...... | 423/607 |
| 171118 | 11/1965 | U.S.S.R. ............................. | 423/607 |
| 236447 | 5/1969 | U.S.S.R. ............................. | 423/607 |
| 546565 | 4/1977 | U.S.S.R. ............................. | 423/607 |

OTHER PUBLICATIONS

Kovel et al., "Zhurmal Prikladnoi Khimii", vol. 43, 1970, pp. 236-240, (pp. 245-248 of translation applied).

*Primary Examiner*—Herbert T. Carter
*Attorney, Agent, or Firm*—Lawrence Rosen

[57] ABSTRACT

Chromic oxide of very low (below 40 ppm) insoluble sulphur content is obtained by calcination of a less pure product at a temperature above 1100° C. for at least 10 minutes.

18 Claims, No Drawings

CHROMIC OXIDE PRODUCTION

This application is a continuation-in-part of U.S. patent application Ser. No. 3,333, Jan. 15, 1979, now abandoned.

Two main industrial uses of chromic oxide are as pigments and in metallurgical applications, i.e. for making chromium metal for use in high performance chromium containing alloys. In practice different qualities of chromic oxide are produced for the two purposes. Thus the pigmentary chromic oxide must have a particle size and constitution such that it has good colour properties. Preferably it has low impurity level but this is not essential. The metallurgical grade however must have low impurity level. In particular its sulphur content must be as low as possible since it is known that the presence of sulphur can be deleterious in alloys made indirectly from the chromic oxide. Ideally therefore the metallurgical grade chromic oxide would have zero sulphur content but in practice the industry has recognised that this is not possible. Thus chromium metal manufacturers and their customers have had to be content with the lowest sulphur content that can be produced by industrially economic processes. Twenty years ago industry had to accept a sulphur content about 100 ppm (parts by weight sulphur per million parts by weight chromic oxide) but more recently metallurgical grade chromic oxide containing as little as 60 or 70 ppm insoluble sulphur has been produced on a commercial scale. Since the sulphur is in insoluble form, its amount cannot be reduced by simple washing.

It is generally recognised that it would be desirable to make metallurgical grade chromic oxide having much lower sulphur contents than this but no such product has ever been made commercially prior to the present invention with the exception of limited quantities produced in Germany prior to 1945 by a process involving the use of specially pure materials and which is described in British and United States Technical Industrial Intelligence Reports B.I.O.S. 679 and F.I.A.T. 814 published in 1946. In this process to obtain chromic oxide containing a maximum of 0.005% sulphur it was necessary to use expensive low-sulphur potassium dichromate and to reduce it with charcoal or wood flour. The procedure, which was laborious and time-consuming was uneconomic and has not been used in recent years.

Very low sulphur values may be obtainable by small scale or laboratory processes that can be operated under carefully controlled conditions. Unfortunately such processes are of little or no help in devising a process that will actually work reliably in large scale industrial production, which is what is necessary in practice, since scaling up a small scale process generally results in increased impurity levels. To be economically viable it is necessary to be able to produce high grade chromic oxide in economically acceptable apparatus at a rate of, for instance, 100 kg/hr or more.

Metallurgical grade chromic oxide is generally made industrially by calcination in a kiln of a mixture of ammonium dichromate and sodium chloride, obtained by in situ reaction of sodium dichromate and ammonium chloride in substantially stoichiometrically equivalent proportions. The calcination temperature has to be above 700° C. to ensure that the chromic oxide has a high $Cr_2O_3$ content but if it is too high there is an increased risk of slag formation in the kiln, and so is generally below 850° C. This is the basis of the process that, with careful optimisation of the calcination temperature and other conditions, is now operated commercially to give about 60 or 70 ppm sulphur.

The use of ammonium sulphate instead of ammonium chloride would often be desirable, e.g. for economic reasons, but cannot be used in this process at present since it gives an unacceptably high sulphur content.

There are other industrial processes for making chromic oxide, but at present they are mainly limited to the production of pigment and other grades of chromic oxide, where some impurities can be tolerated.

Some processes that are alleged to give low sulphur content have been described. For instance in German Patent Specification No. 2635086 it is alleged that it is possible to obtain sulphur values as low as 30 ppm by forming ammonium dichromate by reaction in situ between ammonium sulphate and 11 to 30 mole % excess sodium dichromate and roasting the mixture at 800° to 1100° C. At the higher temperatures proposed there is the risk of slag formation within the apparatus, but a particular disadvantage of this process is that the use of excess sodium dichromate means that the yield of chromic oxide based on sodium dichromate necessarily is very low, thus tending to render the process unattractive.

In the article by Kovel et al in Zhurnal Prikladnoi Khimii Vol. 43 No. 2 pages 236-240 February 1970 there is a detailed discussion as to the reaction mechanisms involved upon reducing sodium chromate with sulphur dioxide. On page 247 it is stated that sulphur may be removed by thermal or chemical methods. The chemical method presumably would have involved, for instance, treating basic sulphur-containing salts of trivalent chromium with sodium hydroxide so as to precipitate hydrated chromic oxide. While such methods may reduce sulphur content they are incapable of producing the very low sulphur values now economically desirable. Also on page 247 it is stated that in a particular calcination process, that necessarily involved eventually driving off chemically bound hydroxyl groups to form the final chromic oxide, sulphur containing salts were decomposed at 700° to 765° C. and that residual impurities were removed completely at 1150° to 1250° C. In particular it is stated that heating a thoroughly washed precipitate for 5 to 15 minutes at 1200° C. gave a product containing 99.1 to 99.6% chromic oxide and 50 to 100 ppm sulphur. This of course is a laboratory process, using small scale apparatus, and there is no disclosure of the manner in which the heating is conducted and this is no more significant commercially than other small scale processes that allegedly produce low sulphur, but which in practice have proved incapable of being scaled up to industrial operation while maintaining the low sulphur values obtained on a small scale process.

Other small scale processes are described in U.S. Pat. No. 3,723,611 and British No. 1,498,300 in which it is alleged that sulphur contents of less than 50 ppm can be achieved by spraying sodium dichromate through a reducing tower in an atmosphere of hydrogen for a residence time of 0.1 to 10 seconds at a temperature of 900° to 1600° C., optionally followed by a similarly short dwell time at a similar temperature, and then collecting the resultant chromic oxide. However this process is again a small scale process, the highest rate of production mentioned being 9 kg/hr, it involves the use of very fine particulate dichromate, a spraying tower, a supply of hydrogen and an alkaline environment. These various features combine to make the process unattractive for commercial operation, and we are unaware of it being used commercially.

Russian Pat. No. 171118 states that chromium oxide can be subjected to thermal treatment, for instance in a rotary furnace, at 1400° C. in order to purify it and states that the final product has 100 to 110 ppm sulphur. Accordingly the sulphur content is in fact far worse than that which is now commercially available by routine production processes.

British Pat. No. 962,193 describes how the bulk density of chromic oxide can be increased by heating the chromic oxide in the presence of a fusible solid, after it has been produced by, for instance, decomposition of ammonium dichromate. The preferred temperatures are 200° to 1200° C. (although a higher temperature is mentioned), all the examples are at 800° or 850° C. and it is stated that in some instances temperatures as low as 350° C. are satisfactory. The amount of fusible solid that is added is preferably 0.1 to 5% but it is stated that concentrations above this are not objectionable. There is no suggestion in the specification that the chromic oxide being produced is intended as metallurgical grade chromic oxide nor is there any reference to the sulphur content of the product. The exemplified processes would inevitably have resulted in no substantial or significant decrease in sulphur content.

In U.S. Pat. No. 2,209,907, a process is described for making chromic oxide pigments which involves the reduction of a partly acidified chromate solution by an aqueous alkaline emulsion of sulphur and sodium sulphide. The hydrated chromic oxide which is first formed is treated to remove alkali compounds and then rapidly furnaced at 2300° to 2500° F. for what is described as a limited time that may approach flash firing. During this heating any basic sulphate formed in the product is, of course, decomposed but there is no suggestion that the firing and decomposition results in low levels of insoluble sulphur. It is stated that it is important to heat the material rapidly and to avoid overheating or prolonged heating, as otherwise the desired fluffy oxide may become more dense.

Accordingly the general state of the art is that metallurgical grade chromic oxide is generally made by the described decomposition of ammonium dichromate in the presence of sodium chloride, (although ammonium sulphate may be useable with excess dichromate), the lowest sulphur content that is commercially available now in metallurgical, or other, chromic oxide is 60 to 70 ppm, and that everyone has recognised that it would be highly desirable to produce lower sulphur contents but in fact with the only previously mentioned exception no one has generated them on an industrial scale. Various theoretical ways for generating lower sulphur contents are known, for instance U.S. Pat. No. 3,723,611, rotary kiln calcination is known but is only alleged to produce a sulphur content of 100 ppm, and subsequent heating of the decomposition product of ammonium dichromate is also known, as described in British Pat. No. 962,193.

Against this background it has been our object to devise an industrial process for making on an industrial scale using simple apparatus metallurgical grade chromic oxide containing much lower insoluble sulphur impurity levels than have been generally available industrially before.

We have now surprisingly found that the desired object can be easily achieved by calcining an appropriate solid product containing chromic oxide or an insoluble chromium compound that will generate chromic oxide provided that the calcination is conducted at a temperature of above 1100° C. for an appropriate time and provided that the product being calcined contains not more than 50% by weight water soluble material, for instance fusible salts.

In particular, a process according to the invention for producing chromic oxide contaminated with less than 40 ppm insoluble sulphur comprises calcining a solid product that either comprises chromic oxide, at least 60 ppm water insoluble sulphur, not more than 50% by weight water soluble material and, optionally, materials that will volatilise during calcining, or a heat decomposable product that will decompose during calcining to form the said solid product and, optionally, volatiles, the calcining being conducted at a temperature of above 1100° C. for a time that is greater than 10 minutes and is such that the insoluble sulphur content is reduced to below 40 ppm and, if the resultant product contains water soluble impurities, washing the product.

Whilst the method can be operated to give very low values, e.g. below 10 ppm and even down to values that are so low that the amount of sulphur cannot be precisely determined, the preferred lower limit is generally above 5 ppm, with the preferred range being 5 to 30 ppm.

The amount by which the sulphur content is reduced to reach this value will depend both upon the starting and the desired final values. It will always be at least 20 ppm but generally is above 50, and often above 100 ppm. For example in a preferred process chromic oxide contaminated with more than 200 ppm sulphur, e.g. 200 to 400 ppm sulphur, is purified to a value of less than 40 ppm sulphur. However a particular advantage of the process is that it is possible to make low sulphur metallurgical grade chromic oxide by a simple calcination process from a product that is high in insoluble sulphur, e.g. more than 1000 ppm sulphur and which may have even been made by, for instance, the use of sulphur as a reducing agent or that may itself be an insoluble chromic sulphate.

Despite these possibly very high initial insoluble sulphur contents it has been found that it is easy to carry out the desired calcination by large scale industrial calcination techniques and to select calcination conditions such that the desired low sulphur content is achieved. Thus the calcination is generally conducted in a kiln that has a through put rate of above 10 kg/hr and generally above 50 kg/hr. The throughput is preferably above 100 kg/hr. for instance 500 to 1000 kg/hr or more. Thus the process is readily compatible with many processes for producing chromic oxide and can be a final stage in an existing chromic oxide production process. It can be used to improve the quality of product made by a method designed for the production of relatively pure metallurgical grade product, or it can be used to improve the quality of, for instance, various pigment grades such that they become suitable for metallurgical use. The final pure product is normally used for metallurgical purposes, but it can be used for other purposes.

Although the kiln may be, for instance, a fluidised bed kiln a particular advantage of the process is that the kiln can be of very simple construction and preferably is the kiln most usually used for calcination of chromic products, namely a rotary kiln. Other kilns that may be used include rotating disc and rotating hearth furnaces and also static furnaces but they are generally less desirable economically. In a typical rotary kiln process the solid product to be calcined having a temperature near ambient, e.g. below 200° C. and often below 50° C., is fed into the cold end of the rotary kiln, where the atmosphere temperature may be, for instance, 500° C. and is carried through the kiln towards the hot end and the rate of passage through the kiln and the rate of heating are such that the material being calcined is at a temperature of above 1100° C. in the kiln for a time of above 10 minutes, and in particular is preferably maintained at the desired maximum temperature for a period of at least 10 minutes. The temperature of calcination, that is to say the maximum temperature, is generally below 1600° C. with temperatures in the range 1150° to 1350° C. generally being preferred.

Calcination is generally conducted under conditions such that the product is at a temperature of above 1100° C., and often at the maximum temperature, for at least 15 minutes and although long periods, such as 6 to 10 hours can be used 4 hours is generally sufficient. In particular 15 minutes to 2 hours is generally preferred. A period of half to 2 hours at a temperature of 1200° to 1300° C. is generally satisfactory for many products. However it must be appreciated that the optimum time in any particular kiln for any particular product depends both upon the kiln and the starting and desired final sulphur contents and upon the temperature of the kiln, with longer times being required at lower temperatures and/or higher initial sulphur content and/or lower final sulphur content.

Usually the combination of temperature and duration that is selected to reduce the sulphur content is such as to result automatically in some growth of particle size, and therefore in an increase in density of the product. For instance the apparent specific gravity (bulk density) may increase by 0.1 or 0.2 or more during the process and the final product may have an apparent specific gravity typical for metallurgical product or often higher than normal. For instance the apparent specific gravity of unpacked material is usually above 1.25 and when it is packed to a constant value the apparent specific gravity is usually at least 1.8, often at least 2. Whereas very low particle size may be important in pigmentary products, increased particle size is often desirable for metallurgical products.

In some instances it is convenient to carry out the calcination on a mixture containing a large amount of fusible salt, but the amount must not be more than 50%, and preferably not more than 30% based on the weight of chromic oxide. If more than 50% is present then unacceptable slag formation occurs in the kiln used for calcination and the resultant slag has to be physically removed, generally by scraping or chipping, from time to time.

Preferably however the amount of soluble salt is much less than 30% and indeed should be very low since the yield increases as the amount of sodium salt decreases. In fact the maximum yield is obtained when the soluble salt content is as near zero as possible. However the presence of a small amount of fusible salt very surprisingly facilitates the removal of the sulphur so that the calcination can be at a lower temperature or for a shorter time for a given degree of sulphur removal if there is a little soluble salt present than if the product to be calcined has been thoroughly washed with the result that it has an extremely low soluble salt content. In practice this surprising improvement in the ease of removal of sulphur is obtainable provided the soluble salt content is above about 0.1%. The best combination of yield and ease of removal of sulphur is thus obtainable when the soluble salt content before the calcination is from 0.1 to 5%, most preferably 0.1 to 0.5%. The presence of soluble salt has the additional advantage that it results in growth of particles so that a larger particle size product is obtained.

The solid product that is to be calcined generally comprises an insoluble chromium compound, and generally all the chromium in the product is in the form of insoluble chromium compound. The insoluble chromium compound may be chromic oxide or one or more compounds that will yield chromic oxide during calcination. The insoluble chromium compound of the solid product that is to be calcined is generally made initially as a mixture with a substantial amount of a water soluble fusible salt or other compound, but as mentioned above the presence of large amounts either in the initial mixture or formed during the calcination is undesirable, and so most at least of the water soluble compound is separated from the mixture before the calcination so as to leave insoluble chromium compound together with less than 50%, and generally less than 5%, of the soluble compound. Typical soluble compounds are fusible salts such as alkali metal halides and sulphates, for example sodium chloride and sodium sulphate and the corresponding carbonates, thiosulphates and hydroxides.

The mixture of insoluble chromium compound and soluble fusible salt may be formed initially as a solid mixture, including solid water soluble compound, in which event separation of this compound from the insoluble chromium compound may be conducted by washing.

Insoluble chromium compounds that may be present in the mixture, and which may be calcined in the invention, include chromic oxide, hydrated chromium oxide, chromic chromates, and insoluble basic chromic sulphates.

A solid mixture of water soluble compound and chromic oxide may be obtained by calcining ammonium dichromate in the presence of sodium chloride or sodium sulphate, as described in more detail below.

Another solid mixture of chromic oxide and water soluble salts which may be removed by washing can be obtained by calcining a dry mixture comprising sodium dichromate and sulphur or sodium dichromate and a carbonaceous reducing agent such as charcoal, sawdust or starch. The mixture ignites during calcination.

Another solid mixture of insoluble chromium compound and soluble salts that may be removed by washing may be obtained by calcining a water soluble chromic sulphate and water soluble salts under conditions such as to increase the basicity of the chromic sulphate to form insoluble basic chromic sulphates of complex composition. The initial water soluble mix of chromic sulphate and salts, generally sodium sulphate, may be made by, for example spray drying a solution of chromic sulphate and the salts which in turn may have been made by sulphur dioxide reduction of an aqueous solution of sodium dichromate.

The mixture of water soluble salts and insoluble chromium compound may have been made by precipitating insoluble hydrated chromic oxide from a solution containing the soluble compounds, in which event the hydrated chromic oxide may be separated from most at least of the water soluble compound by filtration. The precipitate may optionally be washed. The precipitate of insoluble hydrated chromic oxide may have been made by a process comprising reducing sodium dichromate or chromate. For example sodium chromate or sodium dichromate may be reduced in aqueous solution with sulphur to form hydrated chromic oxide precipitate in solutions which may contain sodium thiosulphate, sodium hydroxide or sodium sulphate. In another process sodium dichromate is reduced in aqueous solution with an organic reducing agent. Typical reducing agents are hydrocarbons and their derivatives such as naphthalene compounds, and carbohydrates such as molasses or glucose, in which event the water soluble salts may include sodium carbonate or bicarbonate. This reduction is generally best conducted under elevated pressure and temperature in an autoclave. In another method sodium dichromate is reduced in an acidic aqueous solution with an organic reducing agent (e.g. hydrocarbons such as toluene or anthracene, carbohydrates such as starch or glucose, or in fact any suitable organic reducing agent) to form a solution of dissolved chromic sulphate and dissolved salts, and upon addition of alkali hydrated chromic oxide is precipitated.

The invention is of particular value when applied to the production of chromic oxide by decomposition of ammonium dichromate. In a conventional method described above the chromic oxide product initially obtained upon thermal decomposition of ammonium dichromate contains about 70 to 100% by weight of fusible salt (sodium chloride or sulphate) based on the chromic oxide present and such a product cannot be subjected to the high temperature calcination of the invention, because the prolonged high temperature calcination will result in unacceptable slag formation. This would cause a particular problem when the high temperature calcination of the invention is carried out in a moving kiln, for instance a disc furnace or rotary kiln.

In one method according to the invention some at least of the chromic oxide is produced in situ by decomposition of ammonium dichromate within the same kiln as the high temperature calcination of the invention is to be conducted. Using such a feed stock, in the invention chromic oxide produced by the calcination is recycled to the kiln in an amount sufficient to reduce the amount of fusible salt in the kiln to below 50% and preferably below 30%, based on the total weight of chromic oxide in the kiln (i.e. recycled oxide plus the oxide formed in situ from the ammonium dichromate).

The preferred method of carrying out the invention comprises heating a mixture of water, ammonium dichromate and sodium chloride or sulphate at a temperature above the decomposition temperature of ammonium dichromate and below the slag formation temperature of the mix, washing the reaction product to remove most at least of the sodium chloride or sulphate and then calcining the resultant chromic oxide contaminated with water insoluble sulphur under high temperature and for a period as described above so as to reduce the water insoluble sulphur to the desired value. Usually the calcined material is washed with water and is then dried.

The mixture of ammonium dichromate and sodium chloride or sulphate is generally formed by double decomposition between sodium dichromate and ammonium chloride or sulphate in the presence of water. The mixture may be prepared in any convenient way. For example, solid ammonium salt may be mixed with crystalline sodium dichromate dihydrate optionally in the presence of a small amount of added water, or a concentrated solution of the ammonium salt may be mixed with dichromate in solid form. Usually however, solid ammonium salt is mixed with a concentrated solution of sodium dichromate, for instance containing more than 900 and preferably more than 1500 or even 1700 grams per liter sodium dichromate dihydrate. The amount of ammonium salt should be substantially stoichometrically equivalent to the sodium dichromate although an excess of either, and preferably of the ammonium salt, may be desirable. For instance ammonium sulphate may be present in up to about 5% excess. However excess sodium dichromate may be used, as for example described in German Specification 2635086. When the ammonium salt is ammonium chloride the calcination temperature for the products of the double decomposition reaction is preferably maintained below 800° C. or 850° C. so as to minimise the risk of slag formation but when the ammonium salt is the sulphate temperatures up to 900° C. or sometimes up to 950°–1000° C. may be satisfactory.

Although often convenient to bring about the thermal decomposition by heating at 700° to 900° C., e.g. 750° to 800° C. an advantage of the invention is that the decomposition can be conducted at much lower temperatures without adversely affecting the quality of the product made in the final calcination step. Thus the decomposition may be conducted at a temperature of from 250° or 300° C. up to 700° C., e.g. about 600° C. The thermal decomposition may be conducted in any suitable kiln, for example a rotary kiln and may be conducted for a sufficient time at the chosen temperature to result in complete decomposition. Typically the time is 15 minutes to one hour, generally about 30 minutes.

The feed to the kiln can be made by contacting aqueous alkali metal dichromate with solid ammonium salt in any convenient manner. Generally they are mixed until they form a thick paste which may then be fed direct to this furnace. If mixing is in the presence of so much water that a solution or thin paste is obtained then water may be removed by evaporation, for example by spray drying, prior to or during the feed into the kiln. The ammonium salt may have a particle size of, for instance, 50 to 500 microns, e.g. about 250 microns. Preferably such a particle size is used when the alkali metal dichromate solution is very concentrated e.g. being more than 90%, i.e. more than 1700 g/l sodium dichromate dihydrate. However it is sometimes more convenient to use larger particle size, e.g. 0.5 to 2 millimeter maximum dimension particles for the ammonium salt, especially when the salt is ammonium sulphate. We find surprisingly that if we mix ammonium sulphate of this larger particle size with dichromate solution of 50 to 65% concentration e.g. about 950 g/l sodium dichromate dihydrate for a few minutes at a temperature above about 70° C. we obtain a mix in the form of a slurry or thin paste in which the double decomposition has gone substantially to completion. This mix may be fed directly into a rotary kiln or other furnace to bring about thermal decomposition of the ammonium dichromate. However, if desired the heat requirement in the kiln may be reduced by evaporating water from the reacted mixture before feeding it into the kiln.

After being heated to decompose the ammonium dichromate the resultant mix is washed to remove soluble salts. At least half of the sodium salt present must be removed, and it is preferred to extract nearly all of it so as to prevent appreciable amounts of sodium chromate being formed during the subsequent refurnacing.

The washed product can if required to dried before being subjected to the high temperature calcination, but this is not essential and the wet cake obtained by filtering or centrifuging the washed solid may be fed directly to the furnace.

After the high temperature calcination the chromic oxide is usually subjected to final washing with water. This removes any soluble sulphur compounds which may be present as well as any sodium chromate which has been formed during the refurnacing process. If, however, process conditions have been so chosen that the refurnaced oxide contains negligible amounts of water soluble substances, the final washing step can be omitted. When washing is carried out, the washed product is subsequently dried and if necessary milled.

The following examples illustrate the invention:

EXAMPLE 1

To 143 parts of a hot aqueous solution of sodium dichromate containing 113 parts of $Na_2Cr_2O_7$ is added 60 parts of ammonium sulphate of particle size less than 250 microns. This represents a 5% excess of ammonium sulphate above the amount stoichiometrically equivalent to the dichromate. The mixture is thoroughly stirred to form a thick paste which on cooling solidifies. After being crushed, this solid is heated at 600° C. for 30 minutes in a muffle furnace. The product is washed with water so as to remove approximately 97% of the sodium sulphate initially present. It is then dried and refurnaced at 1150° C. for 30 minutes. After the cooled roast has been washed with water and dried, 65 parts of chromic oxide are obtained containing 99.7% $Cr_2O_3$ and 0.005% S.

EXAMPLE 2

A stoichiometrically equivalent mixture of sodium dichromate and ammonium sulphate is prepared from 60 parts of ammonium sulphate and 150 parts of a hot aqueous solution containing 119 parts of sodium dichromate by the method described in Example 1. The crushed solid is furnaced at 450° C. for 30 minutes in a muffle furnace and is then washed with sufficient water to remove approximately 95% of the sodium sulphate present. The product is dried and refurnaced at 1250° C. for 1 hour. After the cooled roast has been washed with water and dried, 68 parts of chromic oxide are recovered containing 99.6% $Cr_2O_3$ and 0.003% S.

EXAMPLE 3

A stoichiometrically equivalent mixture of sodium dichromate and ammonium sulphate prepared according to the recipe in Example 2 is furnaced at 800° C. for 30 minutes. After being washed with water to remove soluble salts, the product is dried and subsequently refurnaced at 1250° C. for 1 hour. The unwashed refurnaced product contains 99.5% $Cr_2O_3$ and only 0.001% S.

EXAMPLE 4

60% aqueous sodium dichromate solution containing about 950 grams per liter sodium dichromate dihydrate is introduced at 4900 kg/hr into a screw mixer at a temperature of 105° C. into which is later mixed 1330 kg/hr ammonium sulphate crystals having a particle size of 2 mm and less. The mixture is mixed in the mixer at 100° C. for 15 minutes and is continuously discharged as a slurry direct into a rotary kiln at the cold end, at which the temperature is about 400° C. It is carried through the kiln to a maximum temperature of about 850° C. which is maintained for 15 minutes and the resultant product is discharged from the kiln at the rate of 2900 kg/hr. The product is quenched in water and washed in a countercurrent washing system with water at 20° C. The resultant product consists of chromic oxide containing from 500 to 1000 ppm insoluble sulphur and about 0.1% fusible sodium sulphate and other salts. It is fed as a wet paste containing approximately 60% solids at the rate of 2500 kg/hr into a 85 feet long rotary kiln at the cold end, at which the temperature is about 450° C. It is heated within the kiln over a period of about 3 hours to a temperature of 1250° C. and is maintained at that temperature for 30 minutes before being discharged from the kiln. After quenching in water it is washed. The washed product after drying contains 99.5 to 99.7% $Cr_2O_3$ and 10 to 30 ppm S. The particle size and dry bulk density of the chromic oxide are increased by this calcination and the final dry bulk density is usually at least 2 g/ml.

This example may be repeated using 90. sodium dichromate solution and ammonium chloride or ammonium sulphate having a particle size of about 250 microns to obtain similar results. However when using ammonium chloride, the product that is to be further calcined may only have a sulphur content of, for instance, 100 ppm in which event a desired value below 40 ppm S can be obtained by, for instance, maintaining a lower temperature, e.g. 1150° C., for 30 minutes or by maintaining a temperature of 1250° C. for 15 minutes.

EXAMPLE 5

Sulphur dioxide is passed through an aqueous solution of sodium dichromate to form an aqueous solution of soluble basic chromic sulphate together with sodium sulphate in solution. This solution is spray dried and the resultant solid mix introduced into a rotary kiln furnace and heated up to 850° C. in that furnace and maintained at that temperature for 30 minutes. The product is washed with water to yield a mixture of an insoluble chromic sulphate and sodium sulphate or other soluble salts in an amount of 0.1 to 5%. The washed product is calcined in a rotary kiln at a throughput of above 100 kg/hr reaching a temperature in the kiln after about 3 hours of 1250° C. at which it is maintained for 30 minutes. It is washed with water again and dried to give a chromic oxide product containing 10–30 ppm S.

EXAMPLE 6

Hydrated chromic oxide mixed with less than 5% soluble salts are introduced into a rotary kiln at a rate of, for instance, 500 kg/hr and heated up in that kiln over a period of 3 hours to a temperature of 1200° C. and maintained at that temperature for 30 minutes. It is then discharged from the kiln. The discharged product contains for instance 99.5% $Cr_2O_3$ and 30 ppm S.

In one method, the hydrated chromic oxide precipitate is made by reacting sulphur with aqueous sodium chromate at about 100° C. followed by filtration of the resultant hydrated chromic oxide precipitate and washing of it to remove sodium thiosulphate and other sodium salts. In another method the hydrated chromic oxide precipitate is made by reducing aqueous sodium dichromate solution at 120° to 150° C. under pressure with molasses followed by filtration and washing of the precipitate. In another method the hydrated chromic oxide precipitate is made by reducing anthracene in acidic solution with aqueous sodium dichromate followed by the addition of alkali.

EXAMPLE 7

A dry intimate mixture of sodium dichromate and at least a stoichiometric amount of sulphur or charcoal is formed and ignited in a kiln. The resultant product is a mixture of chromic oxide and sodium sulphate or sodium carbonate. It is then washed substantially free of the soluble salt, for instance to a salt content of between 0.1 and 0.5% by weight, and calcined in a rotary kiln at a temperature of about 1200° C. for about 1 hour, to give a product containing less than 30 ppm S.

EXAMPLE 8

To demonstrate the effect of varying the soluble salt content on operability of the process and yield under laboratory conditions a number of mixtures of varying amounts of sodium sulphate and chromic oxide were prepared and calcined in a laboratory muffle furnace.

In one series of experiments the calcination was conducted at 1100° C. for 15 minutes. In this series, when the sodium sulphate content was below 30% by weight the heated product remained free flowing and did not stick to the walls of the container. When the sodium sulphate content was between 30 and 50% by weight there was some sign of sintering and a few soft lumps were formed but these were easily broken down and there was little tendency for the material to stick to the walls of the container. However when the sodium sulphate content was above 50% by weight there was clear evidence of fusion and the hot roast was sticky and adhered to the walls of the container and when cooled the product formed a hard, fused, lumpy mass which was difficult to break up.

In another series of experiments the calcination was conducted at 1250° C. for 2 hours in air and the loss of chromic oxide was observed. It appears that the lost chromic oxide was converted to sodium chromate. The results obtained were as follows:

| % $Na_2SO_4$ (based on $Cr_2O_3$ present | % Loss of $Cr_2O_3$ |
|---|---|
| 0.2 | below 0.05 |
| 1 | 0.3 |
| 5 | 2.0 |
| 10 | 5.1 |
| 20 | 10.5 |

On an industrial scale the losses would probably be rather less but the trend would be the same.

EXAMPLE 9

To demonstrate the effect on ease of sulphur removal of soluble salt content a stoichiometrically equivalent mixture of sodium dichromate (introduced as 89% liquor concentration) and ammonium sulphate (introduced as particles having a surface area of 0.18 m²/g) was stirred, crushed and furnaced at 800° C. for 30 minutes. Different portions of the product were washed to remove different amounts of soluble salt (mainly sodium sulphate) and the soluble salt content of each portion was determined. Each of the portions was dried and subsequently calcined under identical conditions, namely 1150° C. for 30 minutes. The sulphur and chromic oxide contents of the washed products were determined. The results were as follows:

| Soluble Salts (%) before calcination | Sulphur (ppm) after calcination | $Cr_2O_3$ % after calcination |
|---|---|---|
| Nil | 208 | 99.2 |
| 0.04 | 156 | 99.2 |
| 0.13 | 30 | 99.6 |
| 1.02 | 26 | 99.5 |

From this it is apparent that under these calcination conditions sulphur removal is markedly reduced when the soluble salt content decreases below 0.1%.

We claim:

1. A process for the preparation of chromic oxide having a water insoluble sulphur content of below about 40 ppm, which comprises calcining a solid product feed material at a temperature ranging from above 1100° to 1600° C. for a time period of from about 10 minutes to 10 hours, said solid product containing at least 60 ppm water insoluble sulphur and from 0.1 to 50% by weight of water soluble material (based on chromic oxide), and optionally containing materials that will volatise during calcining, and selected from the group consisting of
   (a) impure chromic oxide, and
   (b) a heat decomposable product that will decompose during calcining to form the said solid product feed material.

2. A process according to claim 1 in which the solid product that is to be calcined contains not more than 5% water soluble material (based on chromic oxide).

3. A process according to claim 1 in which the solid product that is to be calcined contains 0.1 to 0.5% water soluble material (based on chromic oxide).

4. A process according to claim 1 in which the calcination is carried out in a rotary kiln.

5. A process according to claim 1 in which the calcination is conducted at a temperature of 1150° to 1350° C.

6. A process according to claim 1 in which the insoluble sulphur content is reduced to a value between about 10 and about 30 ppm.

7. A process according to claim 1 wherein the solid product feed material is first formed as a mixture with more than 50% by weight, based on chromic oxide, of water soluble material; and wherein sufficient water soluble material is initially separated from the mixture before it is calcined so that the solid product contains 0.1 to 50% water soluble material.

8. A process according to claim 7 in which the said mixture includes water soluble material and the mixture is washed to separate the water soluble material from the said solid product.

9. A process according to claim 7 in which the said mixture is made by calcining ammonium dichromate in the presence of sodium chloride or sodium sulphate and the mixture is washed to separate the sodium chloride or sodium sulphate.

10. A process according to claim 7 in which the said mixture is obtained by calcining a mixture of water soluble chromic sulphate and water soluble alkali metal sulphate and the mixture is washed to separate the alkali metal sulphate.

11. A process according to claim 7 in which the said mixture is made by anhydrous reduction of sodium dichromate with sulphur or a carbonaceous material and the mixture is washed to separate the solid water soluble material.

12. A process according to claim 7 in which the said mixture is made by reducing sodium dichromate or chromate in an aqueous medium and precipitating chromium in the form of an insoluble hydrated chromic oxide and the chromium containing compound is separated from most of the water soluble material by filtration.

13. A process according to claim 12 in which the precipitate is additionally washed.

14. A process according to claim 1 in which calcination is conducted in a kiln at a rate of above 100 kg/hr solid product.

15. A process according to claim 1 in which the calcination at a temperature of above 1100° C. results in an increase of the bulk density of the product being calcined.

16. A process for producing a substantially pure chromic oxide having an insoluble sulphur content below 40 ppm which comprises admixing sodium dichromate, water, and ammonium sulphate or chloride; heating the resulting admixture to a temperature above the decomposition temperature of ammonium dichromate; washing the resulting reaction product mixture to reduce the content of water soluble material to 0.1 to 50% by weight and then calcining the washed reaction product mixture at a temperature above 1100° C. to 1600° C. for a time period of from 10 minutes to 10 hours.

17. A process according to claim 16 in which the ammonium salt is ammonium sulphate and has a particle size of 0.5 to 2 mm and the sodium dichromate is introduced as a 50–65% aqueous solution.

18. A process according to claim 16 in which the washing reduces the content of water soluble material to 0.1 to 5% by weight.

* * * * *